3,716,741
Patented Feb. 13, 1973

3,716,741
METHODS OF STIMULATING LUMINESCENCE IN PHOSPHORS
Rustum Roy, 528 S. Pugh St.; Heinz K. Henisch, 346 W. Hillcrest Ave.; and William B. White, 542 Glenn Road, all of State College, Pa. 16801
No Drawing. Filed Oct. 15, 1971, Ser. No. 189,765
Int. Cl. H05b 33/00
U.S. Cl. 313—108 R                         13 Claims

ABSTRACT OF THE DISCLOSURE

Luminescence is caused by subjecting a luminescent phosphor to excitation by a stream of excited, electrically neutral species, so as to cause an energy transfer from said excited species to said luminescent phosphor, whereby said phosphor is caused to luminesce. In a preferred embodiment, the neutral species is OH*, and the phosphor is a rare earth oxide phosphor containing a terbium oxide or europium oxide activator.

BACKGROUND OF THE INVENTION

Field of the invention

This invention relates generally to a technique for stimulating luminescence and more particularly to a method of exciting a luminescent phosphor by the use of a stream of excited, electrically neutral atoms or molecules (hereinafter referred to as "excited neutral species").

Description of prior art

At one time, particularly around the turn of the century, a significant amount of research attention was given to the study of gas mantles, which in those days were commonly used as the light source for gas lanterns, oil lamps or the like. Those gas mantle compositions were usually formed into a bag-like, or skeleton structure, and usually consisted of combinations of rare earth oxides, most often including thorium oxide and minor amounts of a rare earth activator, such as cerium, terbium, or the like. See, for instance, U.S. Pats. 563,524, 703,064, 403,-804, 403,803, and 589,393, as being representative. A fuel, such as a combustible petroleum oil, alcohol or paraffin, was burned in air, and the flame was directed toward the mantle so as to heat the mantle to fairly high temperatures, generally in the order of 800° to 900° C. for alcohol burners, and about 1,400° C. for other types of burners. At these temperatures, the rare earth phosphors would exhibit a bright incandescent glow.

In later years, as the interest in gas mantles waned, very little literature appeared concerning the luminescence of rare earth oxides, although two reports did investigate most of the rare earth oxides and numerous commercial phosphors (V. A. Sokolov, Izv, Akad. Nauk U.S.S.R. Ser. Fiz. 21 (1957) 528; (26 (1962)) 514, and D. M. Mason, Amer. Chem. Soc. Div. Fuel Chem. Preprints Part 1, 11 (2) (1967) 540).

Interest in these rare earth luminescent phosphors continued as the development of fluorescent lamps and other lighting devices, TV and cathode ray tube devices, color TV tubes and lasers demonstrated that their luminescent quantities could be excited by ultraviolet light, or by cathodic bombardment, to produce a source of coherent light, see, for instance, U.S. Pats. 3,494,779, 3,407,325, 3,454,899, and 3,458,450, as being representative. Many of the prior art excitation mechanisms, or means of "pumping" of the luminescent phosphors to higher energy states, however, often resulted in an inefficient utilization of the input energy.

Currently, the most common source of "cold light," i.e., a light source which is not solely dependent upon heat for its emission, is the fluorescent tube. The commercial fluorescent tube usually consists of a quantity of mercury sealed in a phosphor-coated glass tube. A simplified version of what occurs is that an electric discharge passes through the tube causing the mercury to vaporize. The vaporizing mercury releases a quantity of ultraviolet light, which then excites the phosphor, causing visible luminescence. In view of recent public concern over the considerable health hazards attendant to the use of mercury, both during the manufacture of the fluorescent tubes, and in the event of breakage of the tubes, considerable interest has been expressed in developing other sources of ultraviolet light to replace Hg generation of U.V. None of the alternatives so far suggested, however, would be economically feasible, and so the problem seems to remain generally unresolved.

It would be desirable, therefore, to provide a method of generating "cold light" without the use of mercury, and even without the use of ultraviolet light.

SUMMARY OF THE INVENTION

Accordingly, it is one object of this invention to provide a method of exciting an inorganic luminescent phosphor to effect luminescence.

It is another object of this invention to provide a method whereby luminescent phosphors can be excited at relatively low temperatures without a source of ultraviolet light, and without a source of high energy radiation.

Still another object of this invention is to provide a new, highly efficient "cold light" source.

These and other objects have now herein been provided by subjecting a luminescent phosphor to excitation by a stream of excited, electrically neutral atoms or molecules, so as to cause an energy transfer from these excited species to said luminescent phosphor, whereby said phosphor is caused to luminesce. This can be accomplished by the use of a hydrogen diffusion flame, microwave or other discharge which generates streams of neutral species, such as OH*, which are caused to impinge upon the luminescent phosphor maintained at relatively low temperatures of below 500° C. and preferably from 50° C. to 300° C.

DETAILED DESCRIPTION OF THE INVENTION

The mechanism of luminescence of a phosphor, of course, is due to the excitation of the phosphor to one of its higher energy levels. The excited phosphor then emits some of its energy in the form of a photon, or quantum of light. According to the present invention, this excitation is accomplished by bombardment of the phosphor with an electrically neutral atom or neutral molecule, which is in an excited state, i.e., existing at a higher energy level. Suitable excited entities may include, for example, OH*, CH$_3$O*, Cl*, Br*, and NH*. The * represents the independent existence of the atom or free radical in an excited or high energy state. These excited entities are not ions or electrically charged particles, since, unlike such entities, they are electrically neutral. The existence of these neutral species has been confirmed in a great many technical papers in recent years, and they are known to have a longer half life before recombining than independently existing ionic species. For the present invention, especially good results have been obtained by bombardment of the luminescent phosphors with OH*.

The excited species can be generated by a wide variety of conventional methods. For instance, it is well known that such electrically neutral excited species are produced in a simple hydrogen diffusion flame, and they can be produced under certain conditions by subjecting certain gases to conventional microwave discharge, to high frequency discharge or by various plasma flames.

In a simple hydrogen diffusion flame, for instance, it is well known that electrically neutral OH* radicals are produced which will exist in a high energy state. Of course, the flame will also include such ionic radicals as OH⁻, H⁺ and neutral $H_2O$. The excited OH* species eventually will lose its excess energy by collision with other molecules and atoms, and eventually will form $H_2O$. The OH* species can also be produced by microwave discharge through a quantity of water vapor. $CH_3O$* can also be generated from a microwave discharge through methyl alcohol, but its occurrence in a methyl alcohol flame seems to be very slight. Other neutral species which can be generated in a microwave discharge include Cl* from HCl or chlorinated hydrocarbon decomposition, Br* from HBr or brominated hydrocarbon decomposition, and NH* can be obtained from ammonia or hydrazine.

Whereas the old gas lamps required that the temperature of the rare earth phosphor be raised to the point of incandescence, usually 1,400° C. and above, when stimulation is provided by bombardment with an exited neutral species, luminescence can occur at relatively low temperatures, e.g., below about 500° C., and particularly between about 50° C. to 300° C.

Essentially, any phosphor, organic or inorganic, which is capable of exhibiting photoluminescence under the influence of ultraviolet light, or cathodoluminescence under the influence of cathodic bombardment, can be excited with a neutral species to obtain luminescence, visible, infrared or ultraviolet, often at better efficiency, at lower temperatures and/or with greater spectral definition. When inorganic phosphors are used, they usually are made up of two elements, a host and an activator. The host may be any inorganic salt which is an insulator and, when visible light emission is desired, is devoid of energy levels in the visible spectrum. Usually, if the salt is colored, it is indicative of the existence of energy levels in the visible spectrum, and hence colored inorganic salts are not considered to be suitable host materials, where a host must also be chemically able to accept an activator. The best hosts are generally those which have empty, half-filled or filled f-shell atomic configurations, with no low-lying energy levels.

The activator is the portion of the phosphor which causes the luminescence in the visible spectrum. Suitable activators include all of the lanthanide series rare earth salts, except yttrium salts, lanthanum salts, gadolium salts and lutetium salts, which make excellent host materials. Other suitable activators include the salts of ferric ion, divalent and tetravalent manganese ions, stannous ion, lead ion and uranium ion.

The activator is usually combined with the hosts in amounts of up to 5% by weight. Beyond 5%, the efficiency of the luminescence emission decreases considerably until luminescence is entirely extinguished.

One of the unique attributes of the present invention is the finding that when excited neutral species are used to bombard the phosphor, considerably smaller quantities of the activator need be used as compared with excitation by ultraviolet light. In fact, excellent results have been found when the activator is present in amounts of less than about 1% by weight, and even in such small impurity amounts that its presence can only be detected by the fact that their emission characteristics would indicate the presence of the activator. In comparison, when ultraviolet light is used as the stimulant, the activator must be present in amounts of about 3% by weight. Since the activator is usually comparatively expensive, bombardment with neutral species can result in considerable economies, as compared with ultraviolet bombardment.

Suitable hosts, in which good results have been obtained with the activators $Tb^{+++}$ or $Eu^{+++}$, in amounts of less than 1% by weight, are $Y_2O_3$, $La_2O_3$, $Gd_2O_3$, and $Lu_2O_3$. $Zn_2SiO_4$ has proven to be an acceptable host when doped with less than 1% by weight $Mn^{++}$.

$Y_2O_3$, $Lu_2O_3$, $La_2O_3$ and $Gd_2O_3$ will usually naturally contain terbium and/or europium impurities. When terbium impurity is present, upon bombardment the phosphor will exhibit a strong green emission. When europium compounds are present, upon bombardment, the phosphor will exhibit a strong reddish-colored emission. The particular color of the emission obtained has been found to be dependent upon the particular activator used.

One of the simplest ways of demonstrating the luminescent effect of this invention is to pass a hydrogen flame quickly over a coating of a suitable phosphor compound which has been painted onto a Kanthal rod. The flame should be passed quickly enough over the coating so that the coating is not heated beyond the luminescent temperature, although the rod may be fitted with an electric heat source, and/or a water cooling means to more precisely control the temperature of the phosphor. Good results were obtained when using a small one-inch tall flame ⅜ to ½ inches in diameter. Larger flames could be used, but greater cooling would be required to prevent the phosphor from heating up beyond the temperature of the luminescent effect. Since the hydrogen flame will generate a large quantity of OH*, the coating will be subjected to bombardment by OH*, and the luminescent effect will be obtained. Of course, the phosphor can be coated onto any surface, not necessarily a Kanthal rod, and it will still demonstrate the same effects. Also, the phosphor can be in the form of a solid block, or may be only a single grain. Luminescence can also be obtained by passing hydrogen through a porous ceramic, on which the phosphor has been coated, and then igniting the hydrogen above the surface of the ceramic. By this means, luminescence can be obtained over large areas with only a small expenditure of fuel.

It has been theorized that the excitation of the excited neutral species is a chemical phenomena whereby the excited species is chemically combined with the surface of the phosphor. Transfer of the excess energy from the OH* to the lattice, and from the lattice to the electrons of the phosphor, will raise the electrons to their higher energy levels. Luminescence is thus a result of the return of the electrons to their ground state energy levels.

This theory has been derived from experiments using a microwave discharge tube. Samples of rare earth oxide phosphors were placed on a copper probe within a silica tube passing through a microwave cavity. Gases, or gas mixtures, were passed through the tube at controlled pressures and flow rates, while the temperature of the probe was monitored with a thermocouple. The microwave discharge produces excited neutral atoms and radicals from the gas, which flow down the tube. Some ionic species are produced, but their decay times to recombine are much faster than those of neutral species, and they do not, therefore, migrate far from the cavity.

A green luminescence was observed in an $H_2O$ atmosphere at 5 to 10 torr, but no luminescence was found in an $H_2$ atmosphere at any pressure, even less than 1 torr. In fact, small amounts of $H_2$ added to the $H_2O$ atmosphere were found to quench the luminescence. The luminescent intensity was visually monitored with increasing temperature and was observed to have the same behavior as luminescence produced by a hydrogen diffusion flame. This experiment shows that the luminescence is from the phosphor, not from the flame as such, and that the excited species appears to be OH*.

This conclusion was arrived at deductively by eliminating other likely possibilities which could excite or stimulate the phosphor. The microwave discharge tube used had a severe bend between the microwave source cavity and the phosphor sample, so that ultraviolet light was prevented from reaching the sample, and hence was eliminated as a source of the phosphor stimulation. Ionic species have a very short half life and produce a characteristic glow which disappears when they have combined. No glow was observed in the vicinity of the phosphor, and the distance between the microwave cavity and the sample was sufficient that it would be unlikely that any of the short-lived ionic radicals could travel the distance. The sole source of excitation, therefore, seems to be some neutral species other than $H^*$. $OH^*$ is dominant under the stated conditions.

The energy range above ground state of the excited neutral species seems to be approximately 3 to 6 ev., which is slightly above the energy range of most UV emissions. It is theorized that these higher energy levels might account for the greater efficiency of the excited neutral species bombardment, as compared with UV bombardment, in terms of quantity of activator needed for similar luminescence. As indicated above, when excitation is by the neutral species, a significantly lower quantity of activator must be combined with the host to yield a luminescent glow of comparable intensity as obtained with UV excitation.

Since the techniques of this invention are applicable at low temperatures, and exhibit a high degree of efficiency, they lend themselves quite well to adaptation as a source of "cold light." They can therefore be used as a potential replacement for the commonly used fluorescent tubes, which can constitute a potential health hazard due to the relatively large amounts of mercury contained therein. Moreover, unlike other alternatives which have been suggested as substitutes for fluorescent tubes, the present invention does not require the generation of UV, and hence would have a greater economic advantage, as compared with prior art methods of generating UV. It also has the additional advantage that the phosphor used in this system, in general, requires a lower quantity of the more expensive activator materials, than comparable phosphors used with UV sources.

Other possible commercial applications for this technique are in the field of decorative lighting, whereby "gas lamps" using these techniques may be provided which yield multi-colored illumination, depending upon the particular phosphor selected. Another possible commercial application is in the field of display lighting, such as for those applications in which neon light sources are currently used. The advantage of the present invention as compared with neon lighting is the lower degree of energy input required to get a light emission.

Having now generally described the invention, a further understanding can be obtained by reference to certain specific examples which are provided herein for purposes of illustration only and are not intended to be limiting unless otherwise specified.

EXAMPLES

Measurements were made by playing a simple hydrogen diffusion flame 1 inch tall and ½ to ⅜ inches in diameter on a layer of phosphor painted on a Kanthal rod. The phosphor was prepared as a slurry in water, painted on the rod and allowed to dry. The hydrogen diffusion flame impinged on the phosphor surface immediately adjacent to, but not directly on, a thermocouple welded to the rod. Electrical heating and water-cooling of the rod permitted measurement of spectra above and below the equilibrium temperature produced by the flame alone, without varying the combustion rates. Spectra were recorded photographically on a Jarrell-Ash ¾ meter spectrograph using Kodak 103–F or 1–N 10-inch glass plate. The Hg-spectrum was used for wavelength calibration. The spectra were obtained as densitometer traces of the plates.

SPECTRA $Lu_2O_3$ doped with teribum oxide in impurity amounts of less than 1% by weight was found to give a characteristic green colored luminescence.

$Gd_2O_3$ doped with europium oxide in impurity amounts of less than 1% by weight, was found to have a rather broad spectrum with the strongest spectra bands in the 610 to 630 mm. region.

A phosphor was prepared by adding 0.00143 mole fraction of $Tb_2O_3$ to $Y_2O_3$ and reacting in $H_2$ at 1,300° C. for 12 hours. When this phosphor was flame-excited as described above, the luminescence spectrum was found to be very similar to the photoluminescence spectra reported in G. Glasse, et al., Philips Res Repts. 22 (1967) 481 for 5% terbium in various hosts, except that the flame-excited lines seemed unusually sharp.

A sample of 99.9% pure $Lu_2O_3$ was found to provide a spectrally identical, though more intense emission due to $Tb^{3+}$ as an impurity at 0.001 mole fraction. This spectrum consisted of 45 discrete lines between 480 and 690 mm. Neither of these phosphors were luminescent under 2537 or 3650 A. photoexcitation.

TEMPERATURE DEPENDENCE

The brightness of the luminescent emission was found to be a very sensitive function of temperature. As the phosphor was heated in the flame, the brightness typically increased to some maximum value and then decreased as the temperature continued to rise. The maximum in brightness for $Y_2O_3:Tb^{3+}$, measured at 550 mm., occurred at 160° C. For $Y_2O_3:Eu^{3+}$, measured at 611 mm., the maximum intensity was observed at about 220° C. For $LaAlO_3:C_r^{3+}$ measured at 600 mm., the maximum was reacted at about 400° C. 100° C. on either side of the maximum, the brightness had fallen off by a factor of 10. The maximum efficiency in $Gd_2O_3:Eu^{3+}$ fell somewhere below 100° C. Only the high-temperature portion of the curve could be measured because at temperatures below 100° C., water condensed out of the flame and washed the phosphor off the rod. There was considerable variation in the temperature of maximum efficiency with change in activator. All of the above measurements were made on a Cary 14 spectrometer.

Having now fully described the invention, it will be apparent to one of ordinary skill in the art that many changes and modifications can be made thereto without departing from the spirit or scope of the invention as set forth in the appended claims. Accordingly, what is claimed as new and desired to be secured by Letters Patent of the United States is:

1. A method of causing luminescence which comprises subjecting a luminescent phosphor to excitation by a stream of excited, electrically neutral species, so as to cause an energy transfer from said excited species to said luminescent phosphor, whereby said phosphor is caused to luminesce.

2. The method of claim 1, wherein said excited, electrically neutral species is selected from the group consisting of $OH^*$, $CH_3O^*$, $Cl^*$, $Br^*$ and $NH^*$.

3. The method of claim 2, wherein said excited, electrically neutral species is $OH^*$.

4. The method of claim 3, wherein said $OH^*$ stream is generated by a hydrogen diffusion flame which is allowed to impinge upon said phosphor.

5. The method of claim 2, wherein said stream is generated by a microwave discharge through a gaseous atmosphere of a derivative of said neutral species, which upon microwave stimulation will yield said species.

6. The method of claim 5, wherein said gaseous atmosphere is selected from the group consisting of water, hydrazine, ammonia, methyl alcohol, chlorinated hydrocarbon and brominated hydrocarbon.

7. The method of claim 1, wherein said phosphor is maintained at a temperature of below 500° C. while being subjected to said stream of excited neutral species.

8. The method of claim 7, wherein said phosphor is maintained at a temperature of between 50° and 300° C.

9. The method of claim 1, wherein said luminescent phosphor comprises a mixed salt combination of a host and an activator, wherein said host is an inorganic salt which is characterized by being essentially electrically non-conductive and which is free of energy levels in the visible spectrum, and wherein said activator is an inorganic salt which is characterized by the existence of at least one energy level in the visible spectrum, and wherein said activator is contained in said host in an amount of less than 5% by weight.

10. The method of claim 9, wherein said activator is present in said host in an amount of less than 1% by weight.

11. The method of claim 9, wherein said host is selected from the group consisting of $Y_2O_3$, $La_2O_3$, $Gd_2O_3$, and $Lu_2O_3$ and wherein said activator is selected from the group consisting of terbium oxide and europium oxide.

12. The method of claim 9, wherein said host is $Zn_2SiO_4$ and said activator is $Mn_2SiO_4$.

13. A light source utilizing luminescence, which comprises:

a supported luminescent phosphor, means for generating a stream of excited electrically neutral species into proximity to said phosphor, so as to cause an energy transfer from said excited species to said luminescent phosphor, whereby said phosphor is caused to luminesce.

References Cited

UNITED STATES PATENTS 3,399,402    8/1968    Brown, Jr. _____ 313—108 R

JOHN KOMINSKI, Primary Examiner

U.S. Cl. X.R.

313—11